United States Patent [19]

Albertson, Jr.

[11] 4,270,425
[45] Jun. 2, 1981

[54] CIRCLE CUTTING ATTACHMENT

[76] Inventor: Luther D. Albertson, Jr., 3310 Ridgewood Dr., New Albany, Ind. 47150

[21] Appl. No.: 969,216

[22] Filed: Dec. 13, 1978

[51] Int. Cl.² .............................................. B23D 27/00
[52] U.S. Cl. ...................................... 83/411 R; 83/574; 83/916
[58] Field of Search ................... 83/574, 411 R, 409, 83/451, 49, 267, 733, 916

[56] References Cited

U.S. PATENT DOCUMENTS

| 1,914,806 | 6/1933 | Hormel | 83/411 R X |
| 2,956,464 | 10/1960 | Charron | 83/411 R X |
| 3,355,975 | 12/1967 | Anfuso | 83/411 R |
| 3,706,249 | 12/1972 | Bruckner | 83/411 R X |
| 4,047,458 | 9/1977 | Hall | 83/411 R X |

FOREIGN PATENT DOCUMENTS 2701545  7/1978  Fed. Rep. of Germany ............ 83/574

Primary Examiner—Frank T. Yost

[57] ABSTRACT

Apparatus to be utilized as an attachment to hand type power metalworking shears and nibblers for the purpose of performing precision circular metal cutting.

1 Claim, 1 Drawing Figure

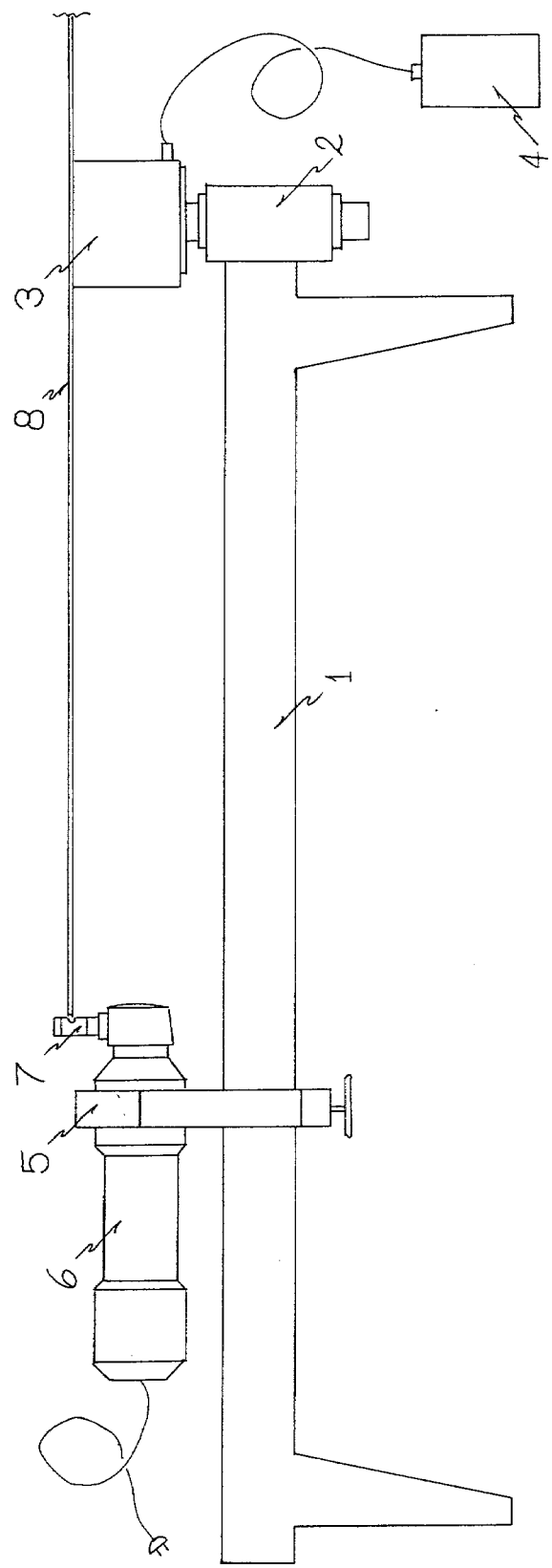

CIRCLE CUTTING ATTACHMENT

THE BACKGROUND OF THE INVENTION

1. Field of the Invention

Metalworking industry and trades.

2. Description of the Prior Art;

Hand type electric and pneumatic metalworking shears and nibblers are designed to be utilized for freehand cutting operations only, thus the degree of speed and accuracy obtainable by their use is dependent solely upon the skill of the user. Hence, their usefulness is necessarily confined to cutting operations permitting only optimum accuracy. Therefore, circle cutting operations requiring absolute precision preclude their use.

SUMMARY OF THE INVENTION

The advantage of the Invention is that it provides a ready means by which the Current Art may be adapted to perform an additional function fulfilling a specific need. That need being a fast, simple economical means of cutting precision rings, discs, etc. from metal without investing in specialized and costly machinery. The concept of the Invention is based upon the principal of replacing Human Skill with mechanical action. This transformation taking place by combining the functions of the Current Art with that of an electro-magnet.

A BRIEF DESCRIPTION OF THE DRAWING;

FIG. 1., View showing general structure and component arrangement.

TECHNICAL DESCRIPTION;

Yoke and clamp assembly 5 holding shear or nibbler 6 is positioned upon support frame 1 so as cutter head 7 is on horizontal alignment with the top center axis of electro-magnet 3 at a distance relative to the diameter of the circle to be rendered; workpiece 8, on which the cut is to be made, is positioned on top of electro-magnet 3 with one edge in contact with cutter head 7; AC to DC current rectifier 4 is switched to the "on mode" energizing electro-magnet 3 causing workpiece 8 to be magnetically held in position; electro-magnet 3 is rotated upon shaft & bearing assembly 2 by hand 360 deg. in either clockwise or counter-clockwise direction feeding workpiece 8 through cutter head 7 producing a circular cut; AC to DC current rectifier 4 is switched to the "off mode" de-energizing the electro-magnet 3 and the workpiece 8 is removed.

What is claimed is:

1. A circle cutting apparatus utilized as an attachment to hand type power metalworking shears and nibblers for the purpose of cutting precision circles comprising;
   a. A ridged support frame upon which is mounted a yoke and clamp assembly for holding and positioning a shear or nibbler along said support frame;
   b. A shaft and bearing assembly rigidly connected to one end of said support frame;
   c. A electro-magnet attached to one end of shaft of said shaft and bearing assembly for holding a workpiece magnetically in position while being rotated 360 deg. by hand;
   d. A AC to DC current rectifier electrically connected to said electromagnet with on-off switch for control.

* * * * *